(12) United States Patent
Fawaz et al.

(10) Patent No.: US 9,471,791 B2
(45) Date of Patent: Oct. 18, 2016

(54) PRIVATE DECAYED SUM ESTIMATION UNDER CONTINUAL OBSERVATION

(75) Inventors: Nadia Fawaz, Santa Clara, CA (US); Aleksandar Todorov Nikolov, New York, NY (US); Jean Bolot, Los Altos, CA (US); Nina Taft, San Francisco, CA (US)

(73) Assignee: THOMSON LICENSING, Issy les Moulineaux (FR)

( * ) Notice: Subject to any disclaimer, the term of this patent is extended or adjusted under 35 U.S.C. 154(b) by 485 days.

(21) Appl. No.: 13/584,930

(22) Filed: Aug. 14, 2012

(65) Prior Publication Data

US 2013/0212690 A1 Aug. 15, 2013

Related U.S. Application Data

(60) Provisional application No. 61/524,905, filed on Aug. 18, 2011.

(51) Int. Cl.
  *G06F 21/60* (2013.01)
  *G06F 21/62* (2013.01)
  *G06F 17/30* (2006.01)

(52) U.S. Cl.
  CPC ......... *G06F 21/60* (2013.01); *G06F 17/30303* (2013.01); *G06F 21/6254* (2013.01)

(58) Field of Classification Search
  CPC .............. G06F 21/60; G06F 17/30303; G06F 21/6254
  USPC .......... 726/26, 27, 28, 29, 30; 713/150, 151, 713/152, 153, 154
  See application file for complete search history.

(56) References Cited

U.S. PATENT DOCUMENTS

| 7,146,574 B2 | 12/2006 | Goldthwaite et al. |
| 7,542,969 B1 * | 6/2009 | Rappaport et al. |

(Continued)

FOREIGN PATENT DOCUMENTS

| WO | WO2007/048008 | 4/2007 |

OTHER PUBLICATIONS

Jagannathan etal: "A Practical Differentially Private Random Decision Tree Classifier", 2009 IEEE Int'l Conf. on Data Mining Workshops;pp. 114-121.

(Continued)

*Primary Examiner* — Brandon Hoffman
*Assistant Examiner* — Nega Woldemariam
(74) *Attorney, Agent, or Firm* — Robert D. Shedd; Richard LaPeruta

(57) ABSTRACT

Described herein is a method and system for providing privacy guarantees with an improved privacy-accuracy trade-off. Dynamic data can be accessed from a database. A sum model is selected from window sum, exponential decay sum, and polynomial decay sum. An algorithm is initiated that produces polylogarithmic bounded error in the range of a sum function associated with the selected sum model and independent of time steps. The data can be assembled in a dyadic tree structure. A non-linearity component can be added to nodes of the dyadic tree structure. For example, this can be a noise components or a weight applied to the update. This can be done, for example, to different nodes differently. Differential private estimators can be constructed for fixed steps of time. The differential private estimators can be applied to a query means or filtering system to enhance privacy protection from potential adversaries.

20 Claims, 2 Drawing Sheets

(56) References Cited

U.S. PATENT DOCUMENTS

| | | | |
|---|---|---|---|
| 2007/0143289 A1* | 6/2007 | Dwork et al. | 707/9 |
| 2007/0168405 A1* | 7/2007 | Pomerantz | 707/205 |
| 2009/0326609 A1* | 12/2009 | Doron | 607/60 |
| 2010/0268734 A1* | 10/2010 | Aggarwal et al. | 707/770 |
| 2011/0064221 A1* | 3/2011 | McSherry et al. | 380/252 |
| 2011/0066600 A1* | 3/2011 | Cormode et al. | 707/689 |

OTHER PUBLICATIONS

Devi etal: "Similarity Search in Recent Biased Time Series Databases Using Vari-DWT and Polar Wavelets", 2010 IEEE, pp. 398-404.

Gupta etal: "Differentially Private Cominatorial Optimization", Oct. 11, 2009, pp. 1106-1125.

Dwork etal: "Calibrating Noise to Sensitivity in Private Data Analysis", Microsoft Research, Silicon Valley, pp. 1-20.

Dwork etal: "Differential Privacy Under Continual Observation", STOC'10, Jun. 5-8, 2010, Cambridge, Mass., 10 pages.

Dwork etal: "Differential Privacy in New Settings", pp. 174-183.

Cohen etal: "Maintaining Time-Decaying Stream Aggregates", At&T Research Labs, PODS 2003, pp. 1-11.

Cormode etal: "An Improved Data Stream Summary: The Count-Min Sketch and its Applications", Rutgers Univ., pp. 1-11.

Datar etal: "Maintaining Stream Statistics over Sliding Windows", Jul. 30, 2011, Dept. of Computer Science, Stanford Univ., pp. 1-14.

Warner etal: "Randomized Response: A Survey Technique for Eliminating Evasive Answer Bias", Journal of the America Statistical Ass., vol. 60. No. 309, Mar. 1965, pp. 63-69.

Chan etal: "Private and Continual Release of Statistics", ACM, vol. V., No. N, Article A, Published Jan. 2011, pp. A-1 through A-23.

* cited by examiner

PRIVATE DECAYED SUM ESTIMATION UNDER CONTINUAL OBSERVATION

CROSS REFERENCE TO RELATED APPLICATIONS

This application claims the benefit of U.S. provisional application No. 61/524,905, filed Aug. 18, 2011, the contents of which are hereby incorporated by reference herein.

BACKGROUND

Nearly any nontrivial physical, hardware or software system has a dashboard continually observing the system variables, and updating various measurements. Such data analysis applications deal with dynamic data: data arrives over time, and there is a need to continually output the result of some analysis f on data seen thus far $D_j$ for each time instant j. This challenges privacy of analysis because the same function is computed on several deltas of the data and the collection of these function values has more potential to leak information than even several queries to different portions of static data.

The notion of differential privacy was extended to address this challenge. In particular, studies of differential privacy with continual observation and analysis identified the problem of computing the running sum of a series of 0/1 updates as an important technical primitive, formulated differential privacy of computing these running sums, and presented upper and lower bounds on accuracy of $\epsilon$-differentially private algorithms for computing running sums. It was shown that an additive accuracy of $$O\left(\frac{1}{\varepsilon}\log^2 T\right)$$

with constant probability is possible for the running sums problem, and that $\Omega(\log T)$ additive error was necessary to answer accurately all running sum queries for all time steps $j \in \lfloor 1,T \rfloor$. The sums problem is a rich problem capable of capturing many analyses by applying suitable predicates to the data items that map them to 0/1.

Algorithms for tracking statistics on dynamic data while preserving privacy under continual observation have been shown. In particular, an algorithm for privacy under continual observation has been presented for the running sum problem. For any fixed time step, the algorithm achieves additive error of $$O\left(\frac{1}{\varepsilon}\log^{1.5} T\right)$$

with constant probability, where T is an upper bound on the maximum size of the input and is assumed to be known to the algorithm. Another continually private algorithm for the running sum problem does not need to be given an upper bound on input size, and uses a dyadic tree data structure. However, the additive error of the algorithm does grow as the size of the processed input grows: at a fixed time step j, it can guarantee an additive error of $$O\left(\frac{1}{\varepsilon}\log^{1.5} j\right)$$

with constant probability, matching the bound of the former algorithm without the need to specify an explicit bound T.

A general transformation of a single output (pan-) private streaming algorithm that satisfies a monotonicity property to an algorithm that is (pan-) private under continual observation has also been presented. However, such a property is not satisfied by algorithms that provide accurate estimates of decayed sums. Furthermore, it has also been shown that functions that change their value by d at least k times for some input and don't change their value on update 0 cannot be approximated to within an additive factor better than O(kd) while satisfying privacy under continual observation.

SUMMARY

Described herein is a method and system for providing privacy guarantees with an improved privacy-accuracy trade-off. Initially, dynamic data can be accessed from a database that has entries collected and/or generated over time. A sum model is selected from the following group of models: window sum, exponential decay sum, and polynomial decay sum. An algorithm is initiated that is adapted to produce bounded error which is polylogarithmic in the range of a sum function associated with the selected sum model and independent of time steps. The data can be assembled in a dyadic tree structure. A noise component can be added to nodes of the dyadic tree structure. For example, different noise components can be added to different nodes. Alternatively, a weight can be added to the contribution of an update. This can be done, for example, to different nodes differently. Differential private estimators can be constructed for fixed steps of time. The differential private estimators can be applied to a query means or filtering system to enhance privacy protection from potential adversaries.

A method is disclosed for providing privacy protection that comprises: accessing dynamic data from a database; selecting a decay sum model; initiating an algorithm adapted to produce a polylogarithmic bounded error in the range of a sum function associated with the selected sum model and time step independent; assembling the dynamic data in a dyadic tree structure; adding a non-uniformity component to nodes of the dyadic tree structure; constructing differentially private estimators for fixed steps of time; and applying the differentially private estimators to a query to enhance privacy protection from potential adversaries. The decay sum model can be selected from the group of sum models consisting of window sum, exponential decay sum, and polynomial decay sum. The dyadic tree structure can be a sequence of dyadic trees and the non-uniformity component can be a noise component. The noise component can be a different noise component for different nodes of the dyadic tree structure and the non-uniformity component can be a weight applied to an update. Also, multiple instances of a window sum algorithm can be run in parallel on a condition that the selected decay sum model is a polynomial decay sum.

Also, a system for providing privacy protection is disclosed that comprises: a query module configured to access a database having continuously updated data; an analysis module configured to select a decay sum model; the analysis module configured to initiate an algorithm adapted to produce polylogarithmic bounded error in the range of a sum function associated with the selected sum model and time step independent; the analysis module configured to assemble the dynamic data in a dyadic tree structure; the analysis module configured to add a non-uniformity component to nodes of the dyadic tree structure; the analysis module configured to construct differentially private estimators for fixed steps of time; and an output module configured to apply the differentially private estimators to a query to enhance privacy protection from potential adversaries. The decay sum model can be selected from the group of sum models consisting of window sum, exponential decay sum, and polynomial decay sum and the dyadic tree structure is a sequence of dyadic trees.

BRIEF DESCRIPTION OF THE DRAWINGS

A more detailed understanding can be had from the following description, given by way of example in conjunction with the accompanying drawings wherein.

DETAILED DESCRIPTION

Figure 1:
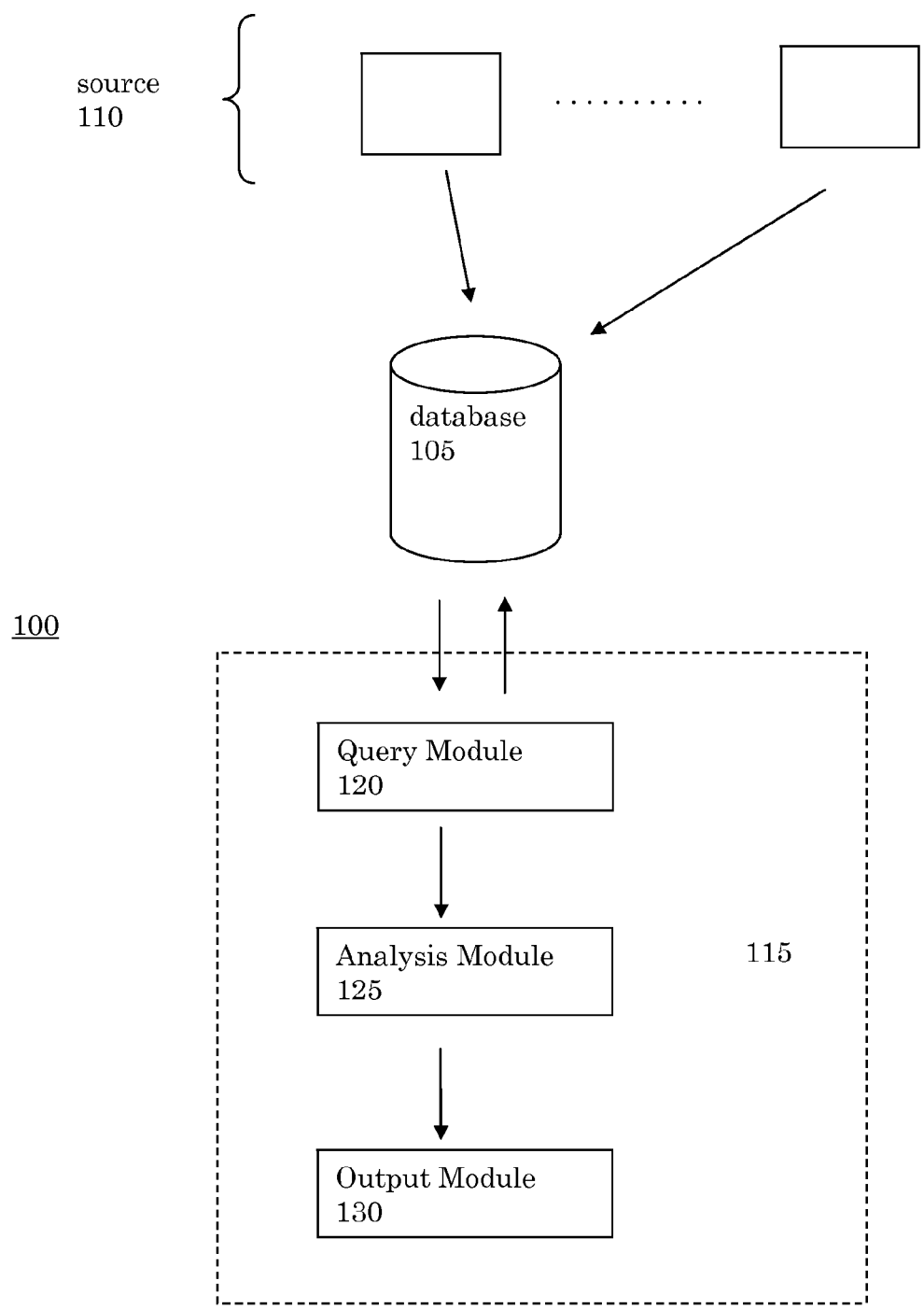
FIG. 1 is an example block diagram for private decayed sum estimation under continual observation.

It is to be understood that the figures and descriptions of embodiments have been simplified to illustrate elements that are relevant for a clear understanding, while eliminating, for the purpose of clarity, many other elements. Those of ordinary skill in the art can recognize that other elements and/or steps are desirable and/or required in implementing the present invention. However, because such elements and steps are well known in the art, and because they do not facilitate a better understanding of the present invention, a discussion of such elements and steps is not provided herein.

The reality in many monitoring applications is that recent data is more important than distant data. Thus, the sums problem for well known decay models of data, from window to exponential and polynomial decay, can be used for privacy under continual observation scenarios. Such "decayed sums" are challenging because (a) while accuracy is needed in analysis with respect to the window or decayed sum, differential privacy is also needed; (b) sums within windows and decayed sums in general are not monotonic or even near-monotonic as previously studied, and many non-monotonic functions cannot be accurately estimated privately. As shown herein, the decay sum functions, which do change their value on update 0, can be well approximated in the continual privacy model despite their inherent non-monotonicity.

Methods and systems for implementing algorithms are described herein for decayed sum in each model which are $\epsilon$-differentially private, and are accurate. For window and exponential decay sums, the algorithms are accurate up to additive $1/\epsilon$ and polylog terms in window parameters; for polynomial decay sums which is technically more challenging because partial solutions don't compose easily, the algorithms have additional relative error. Further, lower bounds are shown that are tight within polylog factors and tight with respect to the number of estimates required to be simultaneously accurate. Previously known algorithms have error at time step j that is dependent on j; by contrast, the algorithms described herein have bounded error, polylogarithmic in the range of the decay sum function, and independent of. The results obtained herein are via a natural dyadic tree that is maintained on dynamic data, but the crux is that the tree data structure is treated in a non-uniform manner: either adding different noise at different nodes, or weighing the contribution of an update to different nodes differently.

As stated above, monitoring applications emphasize recent data more than data long past. For example, monitoring applications typically consider a "window" of continual observations such as, last T time units, or last W updates. More generally, these monitoring applications discount past items based on how far they are in the past, and analyze decayed data.

The methods and systems herein consider differential privacy of continual observations over windows and decayed data. Formally, differential privacy over the entire history of data can be required, but can additionally require stricter accuracy over the window or decayed data. The window stream model lies between incrementing only updates where all data seen thus far is considered, and fully dynamic updates where updates are comprised of arbitrary inserts and deletes, since a shifting window can be thought of as adding a data item on the "right" and deleting a specific item, the one on the "left". It is known in streaming that certain problems that cannot be solved with fully dynamic data can be solved on window streams. A similar issue arises with differential privacy, i.e., do the window or decayed functions, which are non-monotonic in a specific way, lie between the monotonic functions studied thus far for which differentially private and accurate solutions are possible, and arbitrary non-monotonic functions where such solutions are not possible.

In general, at each time step i the algorithm receives a bit $x_i$; at each time step j, the algorithm is required to report an approximation $\hat{F}(x_1, \ldots, x_j)$ to a function $F(x_1, \ldots, x_j)$ and be differentially private. A parameter q is introduced that denotes the number of queries required to be simultaneously accurate with constant probability. The guarantees are valid for any set of q queries, irrespective of their position in the stream: such guarantees are not known for the running sum problem. The results for sufficiently large q are summarized herein below.

In the case of window sum, the window sum problem with window size W requires estimating $$F_w(j,W) = \Sigma_{i=j-W+1}^{j} x_i$$

for each j. Further, the whole sequence $F_w$ of outputs, for all j, should be $\epsilon''$ differentially private. The window sum algorithm is accurate to within an additive term in $$O\left(\frac{1}{\epsilon}\log W \log q\right)$$

the regime $q \geq W$. The algorithm can approximate window sum simultaneously for all window sizes W and for each W, achieves error comparable to the specialized algorithm. A lower bound of $$\Omega\left(\min\left\{W/2, \frac{1}{\epsilon}\log q\right\}\right)$$

is shown. Note that the dependence on the number q of simultaneously accurate queries is optimal. The W/2 term in the lower bound is unavoidable, as the trivial algorithm which outputs W/2 at every time step achieves additive approximation W/2 and is perfectly private.

In the case of the exponential decay sum, the exponential decay sum problem is to estimate $$F_e(j,\alpha) = \Sigma_{i=1}^{j} x_i \alpha^{j-i}$$

accurately, while the whole sequence $F_e$ of outputs, for all j, should be $\epsilon$-differentially private. The algorithm is accurate to within an additive term $$O\left(\frac{1}{\varepsilon}\log\frac{\alpha}{1-\alpha}\log q\right)$$

and has a lower bound of $$\Omega\left(\min\left\{\frac{\alpha}{1-\alpha}, \frac{\log q}{\varepsilon}\right\}\right).$$

The dependence on the number q of simultaneously accurate queries is optimal.

In the case of polynomial decay, the polynomial decay sum problem is to estimate $$F_p(j, c) = \sum_{i=1}^{j} \frac{x_i}{(j-i+1)^c}$$

accurately, while the whole sequence $F_e$ of outputs, for all j, should be $\epsilon$ differentially private. The algorithm returns $$(1 + \pm\beta)F_p(j, c) \pm \left(\frac{1}{c\beta^2}\log\frac{1}{1-\beta}\right)\log q$$

and has a lower bound of $$\Omega\left(1 - \frac{\varepsilon^{c-1}}{\log^{c-1} q}\right).$$

Polynomial decay presents a greater challenge than window sums or exponential decay, as there is no easy way to combine a polynomial decay sum over an interval [a,b] and a polynomial decay sum over another interval [b,c] into a polynomial decay sum over [a·c]. A general technique is described herein that works on a large class of decay sum functions, (including polynomial decay), and reduces the problem of estimating the decay sum to keeping multiple window sums in parallel. The technique results in a bi-criteria approximation, because of which our lower and upper bounds are incomparable for this problem.

In comparison with the simple randomized response strategy, (i.e. with probability $1/2-\epsilon/2$ change update $x_i$ to $1-x_i$ and keep exact statistics of the changed input), the algorithms achieve exponentially smaller additive error. The randomized response leads to estimators with standard deviation proportional to the energy of the decay function, while the estimators described herein have standard deviation polylogarithmic in the energy. Technically, the algorithms keep dyadic tree data structures. However, in order to provide estimates with error polylogarithmic in the range of the decay function, the partial sums framework is extended and the dyadic tree data structure is treated in non-uniform manner by either adding different noise at different nodes, or weighing the contribution of an update to different nodes differently.

The lower bounds also extend the lower bounds of earlier algorithms in two ways: 1) they apply to decay sum problems that have not been considered before; and 2) they apply against the weaker accuracy guarantee that q queries need to be simultaneously accurate, (rather than all queries). All lower bounds are derived from a common framework that is inspired by work on differentially private combinatorial optimization.

Described herein are details for the window sum, exponential decay sum and polynomial decay algorithms. The notation and other preliminary information are presented initially. With regard to the computational model, we consider online problems with binary input: at each time step i the algorithm receives a bit $x_i$; at each time step j, the algorithm is required to report an approximation $\hat{F}(x_1, \ldots, x_j)$ to a function $F(x_1, \ldots, x_j)$.

Described herein are the decayed sum definitions. The functions F we are interested in approximating are decayed sum functions. Consider a non-increasing function $$g: \mathbb{N} \to \mathbb{R}^+$$

such that $g(0)=1$. The decayed sum induced by g is the function:

$$F(j) = F(x_1, \ldots, x_j) = \sum_{i=1}^{j} x_i g(j-i) \quad (1)$$

where F is the convolution of the input $x_1, x_2, \ldots$ and a non-increasing function g. The decayed sum problems that are considered are:
when $$g(i) = 1 \forall, \quad (2)$$

$$F_s(j) = \sum_{i=1}^{j} x_i$$

when $$g(i) = 1_{[i<W]},$$

the window sum problem (with window size W):

$$F_w(j, W) = \sum_{i=j-W+1}^{j} x_i \quad (3)$$

to simplify notation, in the above definition we assume that $x_i = 0 - x_i$ for all $i \le 0$; when $$g(i) = \alpha^i$$

($\alpha<1$), the exponential decay sum problem:

$$F_e(j, \alpha) = \sum_{i=1}^{j} x_i \alpha^{j-i} \quad (4)$$

When $$g(i) = (i+1)^{-c}$$

(c>1), the polynomial decay sum problem:

$$F_p(j, c) = \sum_{i=1}^{j} \frac{x_i}{(j-i+1)^c} \quad (5)$$

The last three problems have not been considered in the differential privacy literature before, and specifically not in the continual observation model.

Described herein is differential privacy. We use the standard definition of differential privacy, applied to the online model of computation specified above, where the definition states: Let A be a randomized online algorithm that at time step j outputs $\hat{F}(x_1, \ldots, x_j) \in \mathbb{R}$.
A satisfies ϵ-differentially privacy if for all $$T \in \mathbb{R},$$

for all measurable subsets $$S \subseteq \mathbb{R}^T,$$

and all possible inputs $x_1, \ldots, x_T$ and all j we have $$\Pr[(\hat{F}(x_1, \ldots, x_i, \ldots, x_k))_{k=1}^T \in S] \leq e^\epsilon$$
$$\Pr[(\hat{F}(x_1, \ldots, 1-x_j, \ldots, x_k))_{k=1}^T \in S], \quad (6)$$

where probability is taken over the coin throws of A.

This is the basic definition of differential privacy but with the modification that the algorithm is required to produce output at every time step, and the whole sequence of outputs is available to an adversary. This model of privacy for online algorithms operating on time series data is termed privacy under continual observation.

The following basic facts about differential privacy can be used as applicable. The first theorem gives a simple way to achieve differential privacy for algorithms with numerical output based on adding random noise scaled according to the sensitivity of the statistic being computed. Theorem 1 states that for a function $$F:\{0,1\}^T \to \mathbb{R}^d,$$

let the sensitivity of F, $S_F$ be the smallest real number that satisfies $$\forall x_1, \ldots, x_T, \forall j \in [T]: \|F(x_1, \ldots, x_j, \ldots, x_T) - F(x_1, \ldots, 1-x_j, \ldots, x_T)\|_1 \leq S_F \quad (7)$$

Then an algorithm that on input $x_1, \ldots x_T$ outputs $$\hat{F}(x_1, \ldots, x_T) = F(x_1, \ldots, x_T) + \text{Lap}(S_F/\epsilon)^d$$

satisfies ϵ-differentially privacy, where $$\text{Lap}(\lambda)^d$$

is the distribution of d independent Laplace random variables with mean 0 and scale parameter λ.

The second fact is that composing multiple privacy mechanisms results in incremental (smooth) privacy loss. Theorem 2 states that let algorithm $A_1$ satisfy $\epsilon_1$-differentially privacy and algorithm $A_2$ satisfy $\epsilon_2$-differentially privacy. Then an algorithm A that on inputs $x=\{x_1, \ldots, x_T\}$ outputs $\mathcal{A}(\mathcal{A}_1(x), \mathcal{A}_2(x))$ satisfies $(\epsilon_1+\epsilon_2)$-differential privacy.

Described herein is the dyadic tree data structure. In the sequel, the following dyadic tree data structure will be used repeatedly. In this instance, let $\tau=\tau(L,U)$ be a complete binary tree, where the leaves are indexed by the integers L, L+1, ..., U, and if two sibling nodes are indexed by the intervals $[l_1,u_1]$ and $[l_1=u_1+1,u_2]$, then their parent is indexed by $[l_1, u_2]$. Note that at level k of the tree, (the leaves being at level 1), the indexing intervals have the form $[L+(i-1)2^{k-1}, L+i2^{k-1}-1]$ for $i \in [1, 2^{h-k+1}]$.

A node whose indexing interval precedes its sibling's indexing interval is termed a left node; the sibling of a left node is a right node. With each node a variable is associated: for the node indexed by [l, u], the associated variable is denoted $c_{lu}$. Given a tree $\tau=\tau(L,U)$ and a prefix interval [L, u], we define the function $s(u,\tau)$ recursively. If [L, u] indexes a node in τ, then $s(u, \tau)=c_{Lu}$. Otherwise, let u' be the largest integer less than u such that [L, u'] indexes some node in τ. Equivalently, u' is the largest integer such that $u'=L+2^k-1<u$. Let τ' be the subtree of τ rooted at the node indexed by $[u'+1,(u'+1)+(L-u')]$ (i.e. the sibling of [L, u']); then $s(u,\tau)=c_{Lu'}+s(u,\tau')$.

The following assertion is made. Assertion 1 states that there exist $r \leq \log(u-L+1)$ integers $L=u_0, u_1, \ldots, u_r, u_{r+1}=u$ such that $$s(u, \mathcal{T}) = \sum_{k=0}^{r} c_{u_k u_{k+1}}. \quad (8)$$

Furthermore, all nodes indexed by $[u_k, u_{k+1}]$ are left nodes in τ, and each node is in a different level of τ.

The integers $u_1, \ldots u_r$ are given directly by the recursive definition of $s(u, \tau)$. To bound r, consider that at each step in the recursion, unless [L,u] indexes a node in τ, the tree τ' has at most half the number of leaves of the smallest subtree of τ that contains u as a leaf. The condition that all nodes are left siblings is easily verified from the definition of $s(u, \tau)$. Finally, notice that the only way to pick two nodes on the same level is if after picking u' in the next step of the recursion we pick the root of τ'. However, in this case we could have picked the parent of [L, u'] instead of [L, u'], a contradiction.

The following Chernoff bound for sums of independent Laplace random variables will be used. The bound is proven using standard techniques. Lemma 1 state that: Let $s_1, \ldots, s_n$ be independent Laplace random variables such that $s_i \sim \text{Lap}(b_i)$. Denote $S=\sum_{i=1}^{n} s_i$ and $\sigma=2\sqrt{\sum_{i=1}^{n} b_i^2}$. Then, for all $$\lambda < \min_i \frac{0.7}{b_i},$$

we have $$\Pr[S \geq t\sigma] \leq \exp(0.9\lambda^2\sigma^2 - \lambda t\sigma). \quad (9)$$

Described herein is the upper bounds for the window sum. A differentially private estimator $\hat{F}_w(j, W)$ is constructed such that at any fixed time step j with good probability $|\hat{F}_w(j,W)-F_w(j,W)| \leq \epsilon$ and ϵ is such that 1) $\epsilon << W$ and 2) ϵ is independent of j. A logarithmic dependence on the number q of estimates required to be simultaneously accurate is shown. Note that an algorithm that satisfies property 2 above is not known for the running sum problem.

Unlike with running sum, only the lowest log W+1 layers of the dyadic tree are needed to compute window sum. However, if a dyadic tree is kept for every window of size W, each update will contribute to more than W variables, resulting in data structures with large sensitivity, which, for differential privacy, translates into more noise. Instead of keeping a dyadic tree for every window, the window can be divided into blocks of size W, and windows can be viewed that span two blocks as the union of a suffix and a prefix of two blocks. This only requires a constant factor of more counters to estimate a single window sum.

An example algorithm for window sum is shown in Table 1.

TABLE 1

(10)

Algorithm 1: WINDOWSSUM
For k ≥ 1,
Define
$\mathcal{T}_k = \mathcal{T}((k-1)W + 1, kW)$, with all $c_{lu}$ initialized to Lap((log W + 1)/ε).
for all inputs $x_i$ do
  add $x_i$ to all $c_{lu}$ in $\mathcal{T}_{\lceil i/W \rceil}$ such that i ∈ [l, u].
output:
$\hat{F}_w(i,W) = s((k-1)W, \mathcal{T}_{k-1}) - s(i - W, \mathcal{T}_{k-1}) + s(i, \mathcal{T}_k)$,
where k = ⌈i/W⌉.
end for The above leads to theorem 3 which states that the algorithm WindowSum satisfies ε-differentially privacy. Furthermore, for any set $Q \subseteq \mathbb{N}$ of size q, with probability 2/3, we have:

$$W \geq q \Rightarrow \forall j \in Q : |\hat{F}_v(j,W) - F_w(j,W)| \leq O(\log^{1.5} W \log^{0.5} q) \quad (11)$$

$$W < q \Rightarrow \forall j \in Q : |\hat{F}_w(j,W) - F_w(j,W)| \leq O(\log W \log q) \quad (12)$$

A proof of the privacy aspect is presented. Observe that any variable $c_{lu}$ used to compute $\hat{F}_w(j,W)$ satisfies 1≤u≤j. Therefore, the counters $c_{lu}$ that contribute to $\hat{F}_w(j,W)$ will not be updated after time step j and $\hat{F}_w(j,W)$ will be identically distributed if it is computed at any time step T≥j. Next we fix T and argue that WindowSum is ε-differentially private for inputs of size T. Since the choice of T is arbitrary, privacy for all T follows. For this purpose, let c(x) be the vector of the values of all variables (in an arbitrary order) $c_{lu}$ such that l≤T when the input is x=($x_1$, . . . , $x_T$). Let also $c_0(x)$ be c(x) with the initializing Laplace noise removed. Observe that, since each contributes to exactly log W+1 variables $c_{lu}$:

$$\forall j \in [T] L \| c_0(x_1, \ldots, x_j, \ldots, x_T) - c_0(x_1, \ldots, 1 - x_j, \ldots, x_T) \|_1 \leq \log W + 1. \quad (13)$$

Differential privacy follows from Equation 13 and Theorem 1.

A proof of the accuracy aspect is presented. It is easy to see that $\mathbb{E} \hat{F}_w(j,W) = F_w(j,W)$.

By Assertion 1, for each k and each u, $s(u_1, \mathcal{T}_k)$ is the sum of at most log W+1 random variables, each with variance $2(\log W + 1)^2/\epsilon^2$.

Therefore, the standard deviation of $\hat{F}_w(j,W)$ is $O(\log^{1.5} W/\epsilon)$.

Next we show that there exists a fixed constant C such that for all large enough q, for any j, $$\Pr[|\hat{F}_\omega(j,W) - F_\omega(j,W)| > C\epsilon] \leq 1/3q, \quad (14)$$

where ε is equal to $\log^{1.5} W \log^{0.5} q$ if W≥q, or to log W log q otherwise. Taking a union bound over all j∈Q for |Q|=q completes the proof of the theorem. We use Lemma 1 to establish Equation 14.

We consider two cases. If W≥q, we set the following parameters:

$$t = C' \sqrt{\ln q}$$

$$\lambda = \frac{t}{\sigma}.$$

In the above C' is a universal constant set so that the assumption of Lemma 1 holds. Then, from Lemma 1 we get that for a constant C we have $$\Pr[|\hat{F}_\omega(j,W) - F_\omega(j,W)| > C \log^{1.5} W \log^{0.5} q] \leq \exp(-\Omega(t^2)). \quad (15)$$

Setting C high enough so that the right hand side of Equation 15 is at most 1/3q completes the proof for this case.

In the other case, if W<q, set the following parameters:

$$\gamma = \log_{\ln q} \ln W = \frac{\ln \ln W}{\ln \ln q}$$

$$C' \frac{\ln q}{\ln^{0.5} W}$$

$$\lambda = \frac{t^{\gamma/(2-\gamma)}}{\sigma}.$$

In the above, C' is a constant chosen so that the assumption of Lemma 1 holds. By Lemma 1, we have:

$$\Pr[|\hat{F}_\omega(j,W) - F_\omega(j,W)| \leq t\sigma] < \exp(-\Omega(t^{2/(2-\gamma)})). \quad (16)$$

On one hand we have:

$$t\sigma = O\left(\log^{1.5} W \frac{\log q}{\log^{0.5} W}\right) = O(\log W \log q). \quad (17)$$

On the other hand, observe that $t = C' \ln^{1-\gamma/2} q$, and, therefore, $t^{2/(2-\gamma)} \geq C'^{2/(2-\gamma)} \ln q$.

Setting C high enough so that the right hand side of Equation 16 is at most 1/3q completes the proof.

The windows sum can be approximated for simultaneously for all window sizes and preserve privacy under continual observation. The approximation guarantee is different for different window sizes W, and for any particular W, it is almost the same as that of Theorem 3. The main observation for this algorithm is that if for window size W, the input is divided into blocks of size W'∈[W,2] instead of exactly W as in WindowSum, then all dyadic tree datastructures can be stored as subtrees of a single dyadic tree. However, storing the whole dyadic tree with the same noise at any level will result in error of size $\Omega(\log^{1.5} T)$ for all W. Instead, the goal is to make sure that within a subtree of height h, the noise added to any variable is proportional to h. To achieve this, a different privacy parameter $\epsilon_k$ at level k of the dyadic tree is used and ensures that the sum of privacy parameters converges to ε.

Let δ>1 be a parameter and ζ(–) be the Riemann zeta function, $\zeta(\delta) = \Sigma_1^\infty i^{-\delta}$ and set $$\epsilon_k = \frac{\varepsilon}{\zeta(\delta) i^\delta}.$$

The algorithm AllWindowSum is shown in Table 2.

TABLE 2

(18)

Algorithm 2: All WINDOWSUM

Initialize $\mathcal{T} = \mathcal{T}(1,1)$, with $c_{1,1}$ initialized to LaP($1/\epsilon_1$).
for all updates $x_i$ do
   if the rightmost leaf of $\mathcal{T}$ is i − 1 then
   Grow $\mathcal{T}$ so that $\mathcal{T} = \mathcal{T}(1,2(i − 1))$, adding additional nodes and
   variables as necessary;
initialize new variables at level k to Lap($1/\epsilon_k$).
   Add the value $c_{1,i-1}^0$ to the root variable
   $c_{1,2(i-1)}$,
Where
$C_{lu}^0$
is the value of $C_{lu}$ without the Laplace noise.
   end if
   Add $x_i$ to all $c_{lu}$ in such that i ∈ [l, u],
   Let W' = $2^{\lceil \log W \rceil}$. At time step i, output:
     $\hat{F}'_w(j,W) = s((k − 1)W, \mathcal{T}_{k-1}) − s(j − W, \mathcal{T}_{k-1}) + s(j, \mathcal{T}_k)$.
   where k = $\lceil j/W' \rceil$.
   end for The above leads to Theorem 4 which that states that the algorithm AllWindowSum satisfies $\epsilon$-differentially. Furthermore, for any set $Q \subseteq N$ of size q and any W constant $\delta > 1$, with probability 2/3, we have:

$$W \geq q \Rightarrow \forall j \in Q: |\hat{F}'_w(j,W) - F_w(j,W)| \leq O(\log^{1.5 \delta} W \log^{0.5} q) \quad (19)$$

$$W < q \Rightarrow \forall j \in Q: |\hat{F}'_w(j,W) - F_w(j,W)| \leq O(\log^\delta W \log q) \quad (20)$$

Described herein is upper bounds for exponential decay. For the exponential decay sum problem, the goal is to design a differentially private estimator that outputs an estimate at every time step, and for any fixed time step j has error at most $\epsilon$ with constant probability, where $\epsilon$ satisfies: 1)

$$\varepsilon \ll \frac{1}{1-\alpha}\left(\frac{1}{1-\alpha}\right),$$

which is the size of the range for the exponential decay sum; and 2) $\epsilon$ is independent of j. These properties are analogous to the properties required for the window sum problem described herein above. The regime of interest is where $\alpha \to 1$, as an algorithm is desired whose error bound grows slowly when the range of the exponential decay sum grows.

While for the window sum problem a sequence of dyadic trees is kept, for the exponential decay problem a single dyadic tree that grows over time is kept. The main property of exponentially decaying sums that is used is that if $S_1$ is the exponential decay sum over a time interval [a,b−1] and $S_2$ is the exponential decay sum over a time interval [b,c], then $\alpha^{a-b+1}S_1 + S_2$ is the exponential decay sum over the time interval [a,c]. Thus at a node in the dyadic tree that is indexed by interval [l,u], the exponential decay sum can be kept for that interval. However, doing this for every interval results in a data structure with unbounded sensitivity. Therefore, only some nodes are updated in the tree. The ExponentialSum algorithm is shown as Table 3.

TABLE 3

Algorithm 3: EXPONENTIALSUM

Initialize $\mathcal{T} = \mathcal{T}(1, 1)$, with $c_{1,1}$ initialized to $\text{Lap}\left(\left(\ln \frac{2\alpha}{1-\alpha} + 1\right) \middle/ .7\alpha\varepsilon\right)$ for all updates $x_i$ do
  if the rightmost leaf of $\mathcal{T}$ is i − 1 then
  Grow $\mathcal{T}$ so that $\mathcal{T} = \mathcal{T}(1,2(i − 1))$, adding additional nodes and variables as necessary and
initializing new variables to $\text{Lap}\left(\left(\ln \frac{2\alpha}{1-\alpha} + 1\right) \middle/ .7\ \alpha\varepsilon\right)$ Add the value
$\alpha^{i-1}c_{1,i-1}^0$
to the root variable $c_{1,2(i-1)}$, where $c_{lu}^0$ is the value of $c_{lu}$ without the Laplace noise.
  end if
  for all [l,u] such i ∈ [l, u] and the node indexed by [l, u] is a left node do
  add $x_i \alpha^{u-i}$ to $c_{lu}$
  end for
  output:

$$\hat{F}_e(j, \alpha) = \sum_{k=0}^{r} c_{u_k, u_{k+1}} \alpha^{j - u_{k+1}}. \quad (21)$$

end for

The proof of privacy is analogous to the proof of privacy for Theorem 3, but we treat different levels of T separately and use Theorem 2 to bound the total privacy loss. More precisely, it is shown that level k in the tree satisfies $\epsilon k_k$-differentially privacy and use the fact that $\Sigma_{k=1}^\infty \epsilon_k = \epsilon$.

The utility analysis is also analogous to the proof of Theorem 3, noticing the following facts: (1) $W \leq W' \leq 2W$; and (2) as an upper bound on the variance of any variable used to compute $\hat{F}'_w(j,W)$, the variance of variables at level log W'+1 can be used, which is $O(\log^\delta W)$. The rest of the proof is unchanged.

The following Assertion 2 is made for the exponential decay algorithm. For an arbitrary i, let $[l_1,u_1], [l_2,u_2], \ldots$ be the sequence of intervals such that $\forall k$: in $\epsilon[l_k,u_k]$ and $[l_k,u_k]$ is a left node. Assume the intervals are ordered in ascending order of $u_k - l_k$. Then $u_k - i \geq 2^{k-1} - 1$.

The proof can be provided by induction. The base case is trivial, as from $i \in [l_1,u_1]$ follows $u_1 - i \geq 0$. For the inductive step, it suffices to show that $u_k - u_{k-1} \geq 2^{k-2}$. By the construction of T, all nodes indexed by intervals [l,u] such that $i \in [l,u]$ (i.e. all nodes satisfying condition (1) lie on the path from the leaf indexed by i to the root of T. Therefore, all nodes indexed by $[l_k,u_k]$ for some k are ancestors of i, and, by the construction of T we have $u_k-l_k+1 \geq 2^{k-1}$. In particular, $[l_k,u_k]$ is an ancestor of $[l_{k-1},u_{k-1}]$ and $u_{k-1}-l_k+1 \geq 2^{k-2}$. By condition (2) all nodes indexed by $[l_k,u_k]$ are left nodes; let the right sibling of $[l_{k-1},u_{k-1}]$ be the node indexed by $[l'_{k-1},u'_{k-1}]$. By construction, $u'_{k-1}-l'_{k-1}=u_{k-1}-l_{k-1}$ and the parent of both nodes is indexed by $[l_{k-1},u'_{k-1}]$. All ancestors of $[l_{k-1},u_{k-1}]$ are indexed by intervals that contain $[l_{k-1},u'_{k-1}]$ as a subinterval, and, therefore:

$$u_k \geq u'_{k-1} = u_{k-1} + (u_{k-1}-l_{k-1}+1) \tag{22}$$

$$\geq u_{k-1} + 2^{k-2} \tag{23}$$

The above leads to Theorem 5 which assumes $\alpha \in (2/3,1)$ and that ExponentialSum satisfies $\epsilon$-differentially privacy. Furthermore, for any set $Q \subseteq N$ of size q, with probability 2/3, we have:

$$\frac{\alpha}{1-\alpha} \geq q \Rightarrow \forall j \in Q: \tag{24}$$

$$|\hat{F}_e(j,\alpha) - F_e(j,\alpha)| \leq O\left(\log^{1.5}\frac{\alpha}{1-\alpha}\log^{0.5}q\right)$$

$$\frac{\alpha}{1-\alpha} < q \Rightarrow \forall j \in Q: \tag{25}$$

$$|\hat{F}_e(j,\alpha) - F_e(j,\alpha)| \leq O\left(\log\frac{\alpha}{1-\alpha}\log q\right)$$

Similar to the proof of Theorem 3, observe that any variable $c_{l,u}$ used to compute $F_e(j,\alpha)$ will not be updated after time step j and $F_e(j,\alpha)$ will be identically distributed if it is computed at any time step $T \geq j$. T is fixed and argue that ExponentialSum is $\epsilon$-differentially private for inputs of size T. Because the choice of T was arbitrary, $\epsilon$-differentially privacy for all sizes T follows.

The noise added to the variables associated with nodes in T is sufficient and can be shown by analyzing the sensitivity of T. Define $c_0(x)$ as in the proof of Theorem 3 and $[l_1,u_1]$, $[l_2,u_2]$, ... as in Assertion 2. Then:

$$\|c_0(x_1,\ldots,x_i,\ldots,x_T) - \tag{26}$$

$$c_0(x_1,\ldots,1-x_i,\ldots,x_T)\|_1 \leq \sum_{k=1}^{\infty}\alpha^{u_k-i}x_i$$

$$\leq \sum_{k=1}^{\infty}\alpha^{u_k-i} \tag{27}$$

$$\leq \sum_{k=1}^{\infty}\alpha^{2^{k-1}-1} = \frac{1}{\alpha}\sum_{k=0}^{\infty}\alpha^{2^k} \tag{28}$$

$$\leq \frac{1}{\alpha}\int_0^{\infty}\alpha^{2x}dx \tag{29}$$

$$= \frac{E_1\left(\ln\frac{1}{\alpha}\right)}{\alpha\ln 2}. \tag{30}$$

Here $E_1(x)=-E_i(-x)$ and $E_i$ is the exponential integral from functional analysis. The following series expansion for $E_1$ is then obtained, which converges for all real $|x| \leq \pi$:

$$E_1(x) = -\gamma - \ln x + \sum_{k=1}^{\infty}\frac{(-1)^{k+1}x^k}{k!k}, \tag{31}$$

where $\gamma$ is the Euler-Mascheroni constant. Since, by assumption, $\alpha > e^{-1}$, then $\ln 1/\alpha > 1$. For $x<1$, the last term in Equation 31 is bounded by $\gamma + E_1(1) = \gamma + 1/2$. Therefore, we have $$E_1\left(\ln\frac{1}{\alpha}\right) \leq -\ln\ln\frac{1}{\alpha} + \frac{1}{2} \tag{32}$$

$$= \ln\frac{1}{\ln\frac{1}{\alpha}} + \frac{1}{2} \tag{33}$$

For $x \in (0,2)$, the following series expansion for $\ln x$ can be obtained:

$$\ln x = x - 1 - \sum_{k=2}^{\infty}\frac{(1-x)^k}{k}. \tag{35}$$

Since by assumption $1/\alpha - 1 > 1/2$, then $\ln(1/\alpha) \geq (1/\alpha-1)/2$. Substituting in Equation 33 results in:

$$E_1\left(\ln\frac{1}{\alpha}\right) \leq \ln\frac{1}{\frac{1-\alpha}{2\alpha}} + \frac{1}{2} = \ln\frac{2\alpha}{1-\alpha} + \frac{1}{2} \tag{36}$$

Substituting Equation 36 into Equation 30 gives the following bound on sensitivity:

$$\|c_0(x_1,\ldots,x_i,\ldots,x_T) - c_0(x_1,\ldots,1-x_i,\ldots,x_T)\|_1 \leq \tag{37}$$

$$\frac{1}{\alpha\ln 2}\ln\frac{2\alpha}{1-1\alpha} + \frac{1}{2\alpha\ln 2}$$

By Theorem 1 and Equation 37, the ExponentialSum algorithm satisfies $\epsilon$-differentially privacy.

The accuracy can be shown as follows. Clearly, $E\hat{F}_\alpha(j,\alpha) = F_e(j,\alpha)$. Next, placing an upper bound $\sigma^2$, the maximum variance of $\hat{F}(j,\alpha)$ over all j. By Assertion 2, all intervals $[1,u_1], [u_1,u_2], \ldots, [u_{r'}, j]$ correspond to nodes in distinct levels of T, and therefore have sizes which are distinct powers of 2. We have, for some fixed constant C.

$$\sigma^2 \leq \left(C\frac{\log\frac{\alpha}{1-\alpha}}{\alpha\varepsilon}\right)^2 \sum_{i=1}^{\infty}\alpha^{2(2i-1)} \tag{38}$$

$$= \left(C\frac{\log\frac{\alpha}{1-\alpha}}{\alpha\varepsilon}\right)^2 \frac{1}{\alpha^2}\sum_{i=2}^{\infty}\alpha^{2^i} \tag{39}$$

$$\leq \frac{1}{\alpha^2}\left(C\frac{\log\frac{\alpha}{1-\alpha}}{\alpha\varepsilon}\right)\alpha^3. \tag{40}$$

The proof can be completed analogously to the proof of Theorem 3.

Described herein is the polynomial decay. Unlike the running sum, window sum, or exponential decay sum problems, there is no easy way to combine a polynomial decay sum over an interval [a,b] and a polynomial decay sum over another interval [b,c] into a polynomial decay sum over

[a,c]. Therefore, the techniques for estimating polynomial decay sum are considerably different from the techniques used for window and exponential decay sums. On a high level, an approximation of the polynomial decay function $g(i)=(i+1)^{-c}$ can be obtained by a function g' that is constant on exponentially growing in size intervals. The decay sum induced by g' can be approximated by running multiple instances of the window sum algorithm in parallel. This technique results in a bi-criteria approximation, i.e. the approximation guarantee has both a multiplicative and an additive approximation factor. As $c \to 1$, (i.e. as the range of the polynomial decay sum grows), the additive approximation factor remains bounded and is dominated by $\beta^{-2}$, where $(1\pm\beta)$ is the multiplicative approximation factor. Thus the approximation guarantees for the algorithm are mostly independent of the exponent of the polynomial decay and are determined by a user-chosen tradeoff between additive and multiplicative approximation. The technique is more general than the techniques for window sum and exponential decay sum, and can be applied to many decay sum problems, but, naturally, with differing approximation guarantees.

For a given polynomial decay function $g=(i+1)^{-c}$ and the induced decay sum F, a multiplicative error parameter $\beta$ can be fixed and a function b can be defined as $\forall j \geq 0$: $b(j)=\max\{i: g(i) \geq (1-\beta)^j\}$. Intuitively g(i) is almost constant for $i \in [b(j-1), b(j))$. A function g' can now be defined that approximates g:

$$\forall i \in [b(j-1), b(j)): g'(i)=(1-\beta)^{j-1} \quad (41)$$

Let F' be the decay sum induced by g'. From the definition of g' it is immediate that:

$$\forall j, \forall x \in \{0,1\}^j : (1-\beta)F(j) \leq F'(j) \leq F(j). \quad (42)$$

Set $$\lambda = \frac{\log(1/(1-\beta))}{\varepsilon c \beta^2} + \frac{1}{\beta}.$$

The PolynomialSum algorithm is shown in Table 4.

TABLE 4

Algorithm 4: POLYNOMIALSUM
  Start an instance of WINDOWSUM for input $x_1, \ldots$ with window size $W_i = b(1) - 1$ and
initializing noise for each variable Lap($\lambda$). Set j* = 1.
  for all updates $x_i$ do
    if i = b(j*) then
    start a new instance of WINDOWSUM for input
$(1-\beta)^{j-1}x_{b(j*)}, (1-\beta)^{j-1}x_{b(j*)+1}, \ldots$
with windows size $W_{j*} = b(j*) - b(j*-1)$ and and initializing noise for each variable
Lap($\lambda$). Set j* = j* + 1.
    end if
    Output $$\hat{F}_p(i, c) = \sum_{j \geq 0: b(j) < i} F_w((1-\beta)^j x_{b(j)}, \ldots, (1-\beta)^j x_i, W_{j+1}). \quad (43)$$

end for

In this case, start an instance of WindowSum for input $x_1, \ldots$ with window size $W_1=b(1)-1$ and initialize noise for each variable Lap($\lambda$). Set j*=1. At time step i, if i=b(j*), start a new instance of WindowSum for input $$(1-\beta)^{j-1}x_{b(j*)}, (1-\beta)^{j-1}x_{b(j*)+1}, \ldots$$

with windows size $W_{j*}=b(j*)-b(j*-1)$ and initialize noise for each variable Lap($\lambda$). Set j*=j*+1. The output at time step k is:

$$\hat{F}_p(k, c) = \sum_{j \geq 0: b(j) < k} F_w((1-\beta)^j x_{b(j)}, \ldots, (1-\beta)^j x_k, W_{j+1}). \quad (44)$$

Note that the j-th instance of WindowSum with input consisting of time updates is called in $\{0,(1-\beta)^{j-1}\}$. It is straightforward to check that the WindowSum algorithm can handle such scaled instances without modification. Note also that the WindowSum algorithm can be modified slightly by adjusting the magnitude of noise added to the variables associated with the dyadic trees kept by WindowSum.

The above results in Theorem 6 which states PolynomialSum satisfies $\epsilon$-differentially privacy. Furthermore, for any set $Q \subseteq N$ of size q, with probability 2/3, then:

$$\forall j \in Q: (1-\beta)F_p(j, c) - O(\varepsilon) \leq \hat{F}_p(c) \leq F_p(j, c) + O(\varepsilon), \quad (45)$$

where $$\varepsilon = \begin{cases} \left(\frac{1}{c\beta^2}\log\frac{1}{1-\beta}\right)^{1.5} \log^{0.5} q & \text{if } \frac{1}{c\beta^2}\log\frac{1}{1-\beta} \geq \log q \\ \frac{1}{c\beta^2}\log\frac{1}{1-\beta}\log q & \text{if } \frac{1}{c\beta^2}\log\frac{1}{1-\beta} < \log q \end{cases} \quad (46)$$

The privacy analysis is analogous to the analysis in the proof of Theorem 3 but sensitivity is bound over all instances of WindowSum. Due to the scaling of the input, the sensitivity of the j-th instance of WindowSum is bounded by $(1+\beta)^{j-1}$ (log $W_j$+1). First, bound $W_j$. Observe that $b(j)=[g^{-1}((1-\beta)^j]$. For $g(i)=(i+1)^{-x}$, we have $b(j) \leq (1-\beta)^{-j/c}+1$. The overall sensitivity is bound by:

$$\sum_{j=1}^{\infty}(1-\beta)^{j-1}\log W_j \sum_{j=0}^{\infty}(1-\beta)^j$$

-continued $$\leq \sum_{j=1}^{\infty}(1-\beta)^{j-1}\log\left(\frac{1}{(1-\beta)^{j/c}} - \frac{(1-\beta)^{1/c}}{(1-\beta)^{j/c}}+1\right) + \frac{1}{\beta} \quad (47)$$

-continued $$\leq \sum_{j=1}^{\infty}(1-\beta)^{j-1}\log\left(\frac{1}{(1-\beta)^{j/c}}\right)+\frac{1}{\beta} \quad (48)$$

$$=\frac{1}{c}\log\left(\frac{1}{(1-\beta)}\right)\sum_{j=1}^{\infty}j(1-\beta)^{j-1}+\frac{1}{\beta} \quad (49)$$

$$=\frac{1}{c\beta^2}\log\left(\frac{1}{(1-\beta)}\right)+\frac{1}{\beta} \quad (50)$$

Theorem 1 and Equation 50 complete the privacy proof.

With respect to accuracy, note that $E\hat{F}(j,c)=F'(j)$. The variance of $F_w((1-\beta)^j x_{b(j)}, \ldots, (1-\beta)^j x_k, W_j)$ is at most $2(1-\beta)^{2j}\lambda^2 \log W_j$. Therefore, the total variance $\sigma^2$ of $\hat{F}_p(j,c)$ is:

$$\sigma^2 \leq \lambda^2 \frac{1}{c}\log\frac{1}{1-\beta}\sum_{i=0}^{\infty}(j+1)(1-\beta)^{2j} \quad (51)$$

$$=\lambda^2 \frac{1}{c\beta^2(2-\beta)^2}\log\frac{1}{1-\beta} \quad (52)$$

$$=O\left(\left(\frac{1}{c\beta^2}\log\frac{1}{1-\beta}\right)^3\right) \quad (53)$$

Using Lemma 1 as in Theorem 3, it is shows that, with constant probability, $$|\hat{F}_p(j,c)-F'(j)|=O\left(\frac{1}{c\beta^2}\log\frac{1}{1-\beta}\log q\right) \text{ (or }$$

$$O\left(\left(\frac{1}{c\beta^2}\log\frac{1}{1-\beta}\right)^{1.5}\log^{0.5}q\right),$$

as appropriate) for all $j \in Q$ with probability 2/3. Applying Equation 42 completes the proof.

This algorithm can more generally be used to compute a private (under continual observation) approximation to a decayed sum F induced by a decay function gas long as $g^{-1}$ grows sub-exponentially. In this case, sensitivity remains bounded and the additive error guarantee is dominated by a function of P, but the exact function depends on g. The algorithm is not applicable to the window or running sum problem since for them $g^{-1}$ is not well defined. The guarantee for exponential decay sum is incomparable with the one in Theorem 5.

Described herein are the lower bounds. A general framework for lower bounding the dependence of algorithms private under continual observation on q, which is the number of estimates required to be simultaneously accurate. The framework is also instantiated with a construction that yields concrete lower bounds for the three decay sum problems considered herein. As far as the dependence on q is concerned, the lower bounds for window and exponential decay sums are tight as shown by the analysis of the algorithms. The lower bound for polynomial decay sums is against a purely additive approximation and is not directly comparable to the bounds on the approximation factors of the algorithm.

Suppose we want to prove that no $\epsilon$-differentially private algorithm can simultaneously and accurately approximate a function $F(x_1, \ldots, x_j)$ for all $j \in Q$ with probability 2/3. Assume that for some T we can construct N+1 instances $x^0, \ldots, x^N$, each of length T, that satisfy the following properties: 1) (Q,C)-independence: for all $a,b \in \{0, \ldots, N\}$, $a \neq b$, there exists some $j \in Q \subseteq T$ such that $|F(x_1^a, \ldots, x_j^a) - F(x_1^b, \ldots, x_j^b)| > 2C$; and 2) D-closeness: for all $a,b \in \{0, \ldots, N\}$, we have $d_H(x^a, x^b) \leq D$, where $d_H$ is the standard Hamming distance.

The following Lemma 2 can thus follow. Assume there exists an $\epsilon$-differentially private algorithm A that at time step j outputs $\hat{F}(x_1, \ldots, x_j)$. Assume further that for any $Q \subseteq N$, $|Q|=q$, we have:

$$Pr[\forall j \in Q: |\hat{F}(x_1, \ldots, x_j) - F(x_1, \ldots, x_j)| \leq C] \geq 2/3. \quad (54)$$

If for some Q there exists a set $(x^0, \ldots, x^N)$ that satisfies (Q, C)-independence and D-closeness with respect to F then:

$$D > \frac{\ln N + \ln 2}{\epsilon} \quad (55)$$

Let $B(x^i) = \{f: |f_j - F(x_1^i, \ldots, x_j^i)| \leq C\}$. By assumption, $Pr[(\hat{F}(x_1^j, \ldots, x_j^j))_{j=1}^T \in B(x^i)] \geq 2/3$. Then, by the definition of differential privacy and D-closeness, we have:

$$\forall i: Pr[(\hat{F}(x_1^0, \ldots, x_j^0))_{j=1}^T \in B(x^i)] \geq e^{-\epsilon D} 2/3. \quad (56)$$

By (Q, C)-independence, $B(x^a) \cap B(x^b) = \emptyset$ for all $a \neq b$. Therefore:

$$Pr\left[(\hat{F}(x_1^0, \ldots, x_j^0))_{j=1}^T \in \bigcup_{i=1}^N B(x^i)\right] = \quad (57)$$

$$\sum_{i=1}^N Pr[(\hat{F}(x_1^0, \ldots, x_j^0))_{j=1}^T \in B(x^i)] \geq Ne^{-\epsilon D} 2/3.$$

However, since $B(x_0) \cap \bigcup_{i=1}^N B(x^i) = \emptyset$, by the assumptions on A we have:

$$Pr\left[(\hat{F}(x_1^0, \ldots, x_j^0))_{j=1}^T \in \bigcup_{i=1}^N B(x^i)\right] < 1/3. \quad (58)$$

Therefore:

$$2N < e^{\epsilon D}, \quad (59)$$

and the lemma follows by taking logarithms.

In order to apply Lemma 2, a method to construct a set of instances satisfying (Q, C)-independence and D-closeness for a given error bound C is needed, such that D is upper bounded by a function of C and N is lower bounded by a function of |Q|. A construction is then shown that allows derivation of a lower bound for any decayed sum problem, where, naturally, the form of the lower bound depends on the specific problem, i.e. on the decay function g. As corollaries, specific lower bounds are derived for the problems considered herein.

Consider a set $\{x^i\}_{i=0}^q$ defined as follows:

$$x^0 = (0^{Dq}) \quad (60)$$

$$x^i = (0^{(i-1)D}, 1^D, 0^{q-iD}). \quad (61)$$

By definition, this set satisfies D-closeness. Set $Q = \{j: D \text{ divides } j\}$. Consider a general decayed sum function $F(x_1, \ldots, x_j)$ with a decay function g by Equation 1. At $j = aD$, $a \neq 0$, then:

$$F(x_1^a, \ldots, x_i^a) = \Sigma_{i=0}^{D-1} g(i) \qquad (62)$$

$$\forall b \neq a: F(x_1^b, \ldots, x_j^b) = 0 \qquad (63)$$

$$F(x_1^0, \ldots, x_j^0) = 0 \qquad (64)$$

Also, for all j, $F(x_1^0, \ldots, x_j^0)=0$. Therefore, to ensure (Q, C) independence, it is enough to set $C=1/2\Sigma_{i=0}^{D-1}g(i)-\delta$ for any $\delta>0$. Then, by Lemma 2:

$$D > \frac{\ln q + \ln 2}{\epsilon}. \qquad (65)$$

Since the decay function g is non-negative:

$$C > \frac{1}{2} \sum_{i=0}^{\frac{\ln q + \ln 2 - \epsilon}{\epsilon}} g(i) - \frac{\delta}{2} \qquad (66)$$

This result is formulated as the main lower bound theorem, Theorem 7. Assume there exists an $\epsilon$-differentially private algorithm A that at time step j outputs $\hat{F}(x_1, \ldots, x_j)$. Assume further that for any $Q \subseteq \mathbb{N}$ $|Q|=q$, we have:

$$Pr[\forall j \in Q: |\hat{F}(x_1, \ldots, x_j) - F(x_1, \ldots, x_j)| \leq C] \geq 2/3, \qquad (67)$$

where F is the decayed sum induced by g. Denote $G(x) = \Sigma_{i=0}^{z-1} g(i)$. Then, for $\log q/\epsilon = O(\alpha/(1-\alpha))$:

$$C \geq \frac{1}{2} G\left(\Omega\left(\frac{\log q}{\epsilon}\right)\right). \qquad (68)$$

For the three problems considered herein, the following corollaries are derived.

The first corollary, Corollary 1 states: assume there exists an $\epsilon$-differentially private algorithm A that at time step j outputs $\hat{F}_w(j, W)$. Assume further that for any $Q \subseteq \mathbb{N}$, we have:

$$Pr[\forall j \in Q: |\hat{F}_w(j, W) - F(_w j, W)| \leq C] \geq 2/3. \qquad (69)$$

Then, $$C \geq \Omega\left(\min\left\{\frac{W}{2}, \frac{\log q}{\epsilon}\right\}\right). \qquad (70)$$

Note that the lower bound of a known algorithm is a special case of the above corollary for q=W=T.

The second corollary, Corollary 2, states: assume there exists an $\epsilon$-differentially private algorithm A that at time step j outputs $\hat{F}_e(j, \alpha)$. Assume further that for any $Q \subseteq \mathbb{N}$, we have:

$$Pr[\forall j \in Q: |\hat{F}_e(j,\alpha) - F_e(j,\alpha)| \leq C] \geq 2/3. \qquad (71)$$

Then, for $\alpha \in (2/3, 1)$:

$$C \geq \Omega\left(\min\left\{\frac{\alpha}{1-\alpha}, \frac{\log q}{\epsilon}\right\}\right). \qquad (72)$$

Proof is established by Theorem 7, where:

$$C \geq \frac{1}{1-\alpha}\left(1 - \exp\left(-\Omega\left(\log\frac{1}{\alpha}\frac{\log q}{\epsilon}\right)\right)\right) \qquad (73)$$

Since for $\alpha > 2/3$, $$\log\frac{1}{\alpha} \geq \frac{1-\alpha}{2\alpha}:$$

$$C \geq \frac{1}{1-\alpha}\left(1 - \exp\left(-\Omega\left(\frac{1-\alpha}{\alpha}\frac{\log q}{\epsilon}\right)\right)\right) \qquad (74)$$

If $\frac{\log q}{\epsilon} = O\left(\frac{1-\alpha}{\alpha}\right)$, then use the inequality $e^{-x} \leq C'(1-x)$ for some constant C'. We get:

$$C \geq \Omega\left(\frac{\log q}{\alpha \epsilon}\right). \qquad (75)$$

Since the right hand side of Equation 73 is monotonically increasing in log q, for $$\frac{\log q}{\epsilon} = \Omega\left(\frac{1-\alpha}{\alpha}\right),$$

we have $$C \geq \Omega\left(\frac{1-\alpha}{\alpha}\right).$$

The third corollary, Corollary 3, states: assume there exists an $\epsilon$-differentially private algorithm A that at time step j outputs ij, c). Assume further that for any $Q \subseteq \mathbb{N}$, we have:

$$Pr[\forall j \in Q: |\hat{F}_p(j,c) - F_p(j,c)| \leq C] \geq 2/3. \qquad (76)$$

then:

$$C \geq H_c\left(\Omega\left(\frac{\log q}{\epsilon}\right)\right) \geq \Omega\left(1 - \frac{\epsilon^{c-1}}{\log^{c-1} q}\right), \qquad (77)$$

where $H_c(k)$ is the k-th generalized harmonic number in power c.

In general, the algorithms described herein can be used in methods and systems that provide differential privacy guarantees with an improved privacy-accuracy trade-off. For example, the sums can be functions that can be used in recommendation systems. The algorithms can be the basis for recommendation systems with differentially private guarantees and better recommendation accuracy.

FIG. 1 is an example block diagram 100 for providing privacy guarantees with an improved privacy-accuracy trade-off. In particular, a system 115 can provide private decayed sum estimation for data under continual observation or data that is being continually updated. A database 105 can collect or generate data over time from source 110, which can be include one or many different source components. The system 115 can include a query module 120, an analysis module 125 and an output module 130. The query module 120 can query or access the database 115. The analytic module 125 can process the queried data as described herein above and as shown in flowchart 200 herein below. The output module 130 can apply the processing results to enhance privacy protection from potential adversaries.

Figure 2:
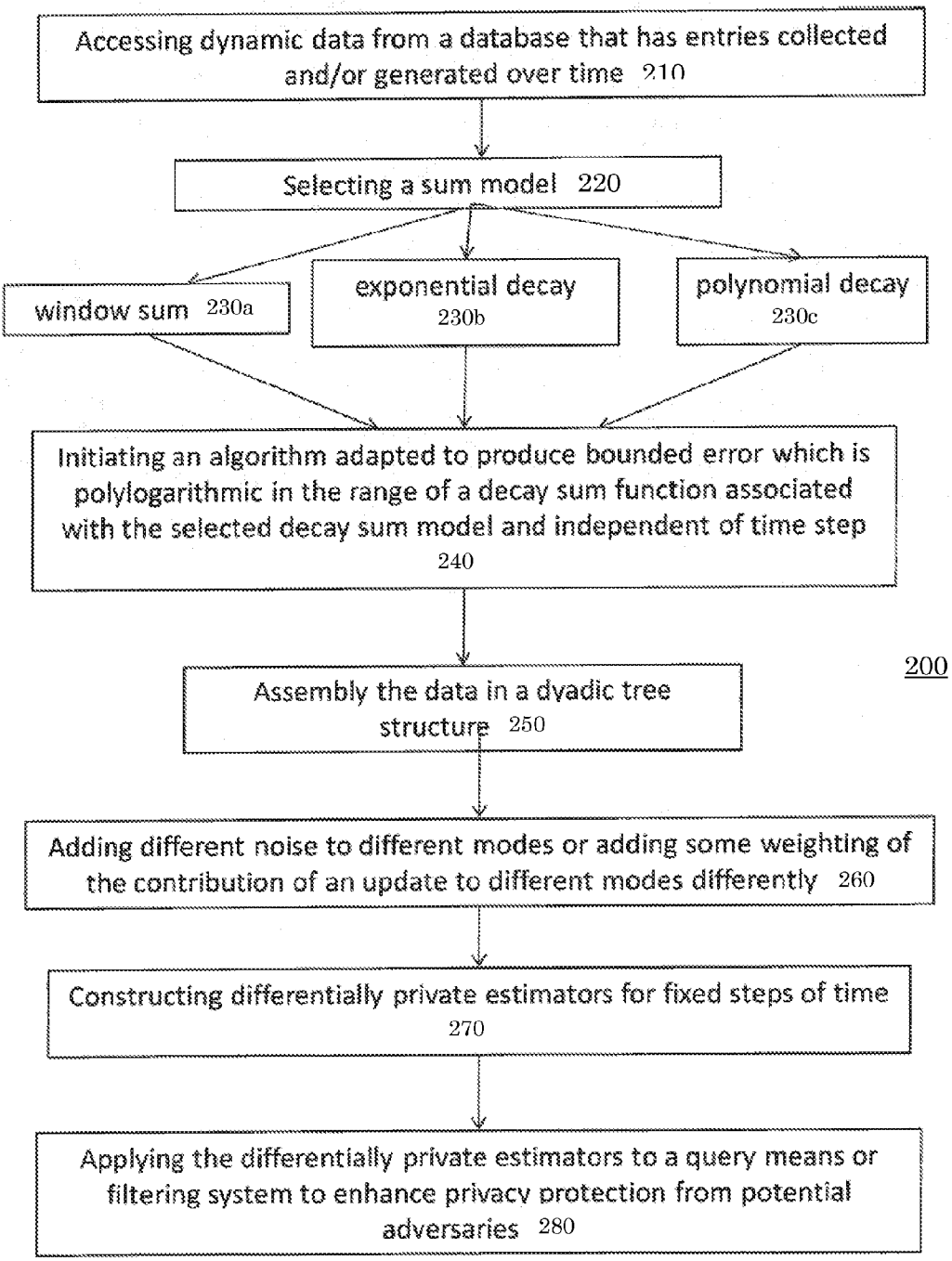
FIG. 2 is an example flowchart of a method for private decayed sum estimation under continual observation.

FIG. 2 is an example flowchart 200 for providing privacy guarantees with an improved privacy-accuracy trade-off. Initially, dynamic data can be accessed from a database that has entries collected and/or generated over time (210). A sum model is selected (220) from the following group of models: window sum (230*a*), exponential decay sum (230*b*), and polynomial decay sum (230*c*). An algorithm is initiated that is adapted to produce bounded error which is polylogarithmic in the range of a sum function associated with the selected sum model and independent of time steps (240). The data can be assembled in a dyadic tree structure (250). A noise component can be added to nodes of the dyadic tree structure (260). For example, different noise components can be added to different nodes. Alternatively, a weight can be added to the contribution of an update. This can be done, for example, to different nodes differently. Differential private estimators can be constructed for fixed steps of time (270). The differential private estimators can be applied to a query means or filtering system to enhance privacy protection from potential adversaries (280).

There have thus been described certain examples and embodiments of methods to provide enhanced privacy protection for continually updated data. While embodiments have been described and disclosed, it will be appreciated that modifications of these embodiments are within the true spirit and scope of the invention. All such modifications are intended to be covered by the invention As described herein, the methods described herein are not limited to any particular element(s) that perform(s) any particular function(s) and some steps of the methods presented need not necessarily occur in the order shown. For example, in some cases two or more method steps can occur in a different order or simultaneously. In addition, some steps of the described methods can be optional (even if not explicitly stated to be optional) and, therefore, can be omitted. These and other variations of the methods disclosed herein will be readily apparent, especially in view of the description of the method described herein, and are considered to be within the full scope of the invention.

Although features and elements are described above in particular combinations, each feature or element can be used alone without the other features and elements or in various combinations with or without other features and elements.

In view of the above, the foregoing merely illustrates the principles of the invention and it will thus be appreciated that those skilled in the art will be able to devise numerous alternative arrangements which, although not explicitly described herein, embody the principles of the invention and are within its spirit and scope. For example, although illustrated in the context of separate functional elements, these functional elements can be embodied in one, or more, integrated circuits (ICs). Similarly, although shown as separate elements, any or all of the elements can be implemented in a stored-program-controlled processor, e.g., a digital signal processor, which executes associated software, e.g., corresponding to one, or more, of the steps shown in, e.g., FIG. 2. It is therefore to be understood that numerous modifications can be made to the illustrative embodiments and that other arrangements can be devised without departing from the spirit and scope of the present invention as defined by the appended claims.

What is claimed is:

1. A method for providing privacy protection, comprising:
accessing dynamic data from a database;
selecting a decay sum model;
initiating an algorithm adapted to produce a polylogarithmic bounded error in the range of a sum function associated with the selected sum model and time step independent;
assembling the dynamic data in a dyadic tree structure;
adding a non-uniformity component to nodes of the dyadic tree structure;
constructing differentially private estimators for fixed steps of time; and
applying the differentially private estimators to a query to enhance privacy protection from potential adversaries.

2. The method of claim 1, wherein the decay sum model is selected from the group of sum models consisting of window sum, exponential decay sum, and polynomial decay sum.

3. The method of claim 1, wherein the dyadic tree structure is a sequence of dyadic trees.

4. The method of claim 1, wherein the non-uniformity component is a noise component.

5. The method of claim 4, wherein the noise component is a different noise component for different nodes of the dyadic tree structure.

6. The method of claim 1, wherein the non-uniformity component is a weight applied to an update.

7. The method of claim 6, wherein the weight is applied differently for different nodes of the dyadic tree structure.

8. The method of claim 1, wherein multiple instances of a window sum algorithm are run in parallel on a condition that the selected decay sum model is a polynomial decay sum.

9. A system for providing privacy protection, comprising:
a memory storing a query module, an analysis module, and an output module, the query module configured to access a database having continuously updated data;
the analysis module configured to select a decay sum model;
the analysis module configured to initiate an algorithm adapted to produce polylogarithmic bounded error in the range of a sum function associated with the selected sum model and time step independent;
the analysis module configured to assemble the dynamic data in a dyadic tree structure;
the analysis module configured to add a non-uniformity component to nodes of the dyadic tree structure;
the analysis module configured to construct differentially private estimators for fixed steps of time; and
the output module configured to apply the differentially private estimators to
a query to enhance privacy protection from potential adversaries.

10. The system of claim 9, wherein the decay sum model is selected from the group of sum models consisting of window sum, exponential decay sum, and polynomial decay sum.

11. The system of claim 9, wherein the dyadic tree structure is a sequence of dyadic trees.

12. The system of claim 9, wherein the non-uniformity component is a noise component.

13. The system of claim 12, wherein the noise component is a different noise component for different nodes of the dyadic tree structure.

14. The system of claim 9, wherein the non-uniformity component is a weight applied to an update.

15. The system of claim 14, wherein the weight is applied differently for different nodes of the dyadic tree structure.

16. The system of claim 9, wherein multiple instances of a window sum algorithm are run in parallel on a condition that the selected decay sum model is a polynomial decay sum.

17. A non-transitory computer readable medium bearing instructions for protecting
privacy of data, comprising:
instructions for accessing dynamic data from a database;
selecting a decay sum model;
initiating an algorithm adapted to produce polylogarithmic bounded error in the range of a sum function associated with the selected sum model and time step independent;
assembling the dynamic data in a dyadic tree structure;
adding a non-uniformity component to nodes of the dyadic tree structure;
constructing differentially private estimators for fixed steps of time; and
applying the differentially private estimators to a query to enhance privacy protection from potential adversaries.

18. The non-transitory computer readable medium of claim 17, wherein the decay sum model is selected from the group of sum models consisting of window sum, exponential decay sum, and polynomial decay sum.

19. The non-transitory computer readable medium of claim 17, wherein the non-uniformity component is applied differently for different nodes.

20. The non-transitory computer readable medium of claim 17, wherein multiple instances of a window sum algorithm are run in parallel on a condition that the selected decay sum model is a polynomial decay sum.

* * * * *